(12) United States Patent
Urbach et al.

(10) Patent No.: US 8,280,891 B1
(45) Date of Patent: Oct. 2, 2012

(54) SYSTEM AND METHOD FOR THE CALIBRATION OF A SCORING FUNCTION (75) Inventors: Shlomo Urbach, Rehovot (IL); Yuval Netzer, Tel Aviv (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/163,014

(22) Filed: Jun. 17, 2011

(51) Int. Cl.
G06F 17/30 (2006.01)

(52) U.S. Cl. ............... 707/748; 707/758; 706/20

(58) Field of Classification Search .......... 707/748–750, 707/758, 999.006, 999.01, 999.107; 706/12, 706/20
See application file for complete search history.

(56) References Cited

U.S. PATENT DOCUMENTS

| | | | |
|---|---|---|---|
| 7,593,904 B1* | 9/2009 | Kirshenbaum et al. | 706/12 |
| 8,185,544 B2* | 5/2012 | Oztekin et al. | 707/768 |
| 2007/0168354 A1* | 7/2007 | Ramer et al. | 707/10 |
| 2008/0098005 A1* | 4/2008 | Goradia | 707/10 |
| 2008/0189281 A1* | 8/2008 | Cancel et al. | 707/6 |
| 2009/0287657 A1* | 11/2009 | Bennett | 707/3 |
| 2010/0241507 A1* | 9/2010 | Quinn et al. | 705/14.42 |
| 2012/0137367 A1* | 5/2012 | Dupont et al. | 726/25 |

* cited by examiner

Primary Examiner — Leslie Wong
(74) Attorney, Agent, or Firm — Lerner, David, Littenberg, Krumholz & Mentlik, LLP (57) ABSTRACT A system and method for calibrating a scoring function. The scoring function S(input, classification) provides a score based on the amount of evidence a particular input has in connection with a particular classification. For example, a street level image may be OCR'ed so as to indicate the names of establishments contained within the image, and the scoring function indicates how much evidence exists within the image for a particular establishment. Some establishments (i.e. classifications) may produce higher scores based on the nature of the establishment rather than the nature of the image (i.e. input) causing any ranking of establishments done on the basis of the scoring function to be biased. Accordingly, the scoring function is calibrated by determining the probability distribution of scores for an establishment over a false set of images that do not display the establishment. The scoring function is calibrated so as to adjust the score to overcome such bias.

20 Claims, 8 Drawing Sheets

SYSTEM AND METHOD FOR THE CALIBRATION OF A SCORING FUNCTION

BACKGROUND OF THE INVENTION

Any set of inputs may be classified in connection with some target criteria. For example websites, images, books, etc. may be classified in accordance to whether the input references a particular word, business, topic, etc. (e.g., target criteria). Some of the inputs will correspond more strongly with some target criteria. Accordingly, it is possible to compare multiple inputs with a particular target criterion to determine which input has the strongest correlation with that target. For example, it is easy to determine which websites contain the most references to a particular word.

However, the same is not true when only one input is used to determine its relative correspondence to multiple target criteria. Often, the nature of the target criteria, rather than the content of the input, will produce a high correspondence. For example, the fact that a website contains more references to a first phrase compared with a second phrase is not a meaningful comparison if the first phrase is common and found in most websites.

BRIEF SUMMARY OF THE INVENTION

An aspect of the invention provides for a method and apparatus for calibrating a scoring function. The method includes receiving a first classification and accessing a scoring function, wherein the scoring function provides a score indicating a degree to which an input relates to a classification; accessing a set of background inputs that have no more than an incidental relation to the first classification; applying the scoring function to each of the background inputs in connection with the first classification so as to create a first distribution of background scores; receiving a first input that is not included in the set of background inputs; altering the scoring function in accordance with the first distribution of background scores so as to create a first calibrated scoring function; and determining a first calibrated score for the first input in connection with the first classification using the first calibrated scoring function.

In another aspect of the method, the first input and the set of background inputs are images, the classification is an establishment, and the score from the scoring function relates to the amount of evidence that exists as to whether the establishment appears within a particular image.

In still another aspect of the method, the first input, the set of background inputs, and classification are websites, and the score from the scoring function relates to the number of users that visited both the first input website and one or more classification websites.

In yet another aspect of the method, the first input and the set of background inputs include text, the classification is a phrase, and the score from the scoring function relates to number of times the phrase appears within a particular input.

In another aspect of the method, the first input and the set of background inputs are documents, websites, or books.

In still another aspect of the method, the determining of the calibrated score includes creating a cumulative distribution function (CDF), the CDF indicating, for a subset of potential scores, the probability of the distribution of background scores being higher than each of the potential scores. Also, determining the calibrated score may include smoothing the CDF, such as by using one of a Hamming filter or Gaussian filter, and calculating the $-\log_2(CDF)$.

In yet another aspect of the method, the method includes receiving a plurality of classifications, wherein the scoring function provides a scores indicating a degree to which inputs relate to the classifications; applying the scoring function to each of the background inputs in connection with the classifications so as to create distributions of background scores; altering the scoring function in accordance with the each distribution of background scores so as to create a plurality of calibrated scoring function; determining calibrated scores for the first input in connection with the plurality of classifications using the calibrated scoring functions; and comparing the plurality of calibrated scores. In addition, the calibrated scores may be for different inputs in connection with the plurality of classifications. Also, the method may include transmitting data over a network based on the comparison of the calibrated scores.

In another aspect of the method, the method includes accessing a set of default classifications; applying the scoring function to each combination of background inputs and default classifications, so as to create a default background distribution; altering the first calibrated scoring function in accordance with the default background distribution; comparing the default background distribution to the first distribution of background scores; and wherein the altering of the first calibrated scoring function only occurs if the first distribution of background scores indicates a higher score than the default background distribution.

DETAILED DESCRIPTION

There are instances when it would be beneficial to classify some set inputs (e.g., a website, image, book, etc.) as corresponding with a set of target criteria. For example, does the input reference a particular word, business, topic, etc? In many instances, some of the inputs will correspond more strongly with some targets. Accordingly, the correlation between each input and each target could be given a score using some scoring function S(input, target). This scoring function could be used to compare multiple inputs with a particular target to determine which input has the strongest correlation to that target. For example, the scoring function S(input, target) could be used in connection with a set of websites to determine which website references a particular business the most.

Alternatively, the scoring function could be used in connection with set of targets and only one input. For example, one website may be selected, and the scoring function is performed for that website to determine it's correlation with multiple businesses. In this instance, it is possible that certain targets might be more likely to create a higher correlation than other targets based solely on the nature of the target, rather than the nature of the input. For example, if the input is a website and the targets are business names, the scoring function S(input, target) will likely create a higher correlation value for a business name that uses common words (e.g., "City Diner") compared to a business without any common words. Accordingly, the benefit of comparing the scoring function for a particular input with various targets is diminished due to the (partial) false positives that are created by some of the targets, or based on the target common to most inputs.

Aspects of the method and system disclosed herein allow for the calibration of the scores produced by particular targets by scaling the scoring functions of those targets. Specifically, the scoring function for a particular target is scaled so as to create a calibrated scoring function S'(input, target). This calibration process will be described in more detail below.

Figure 1:
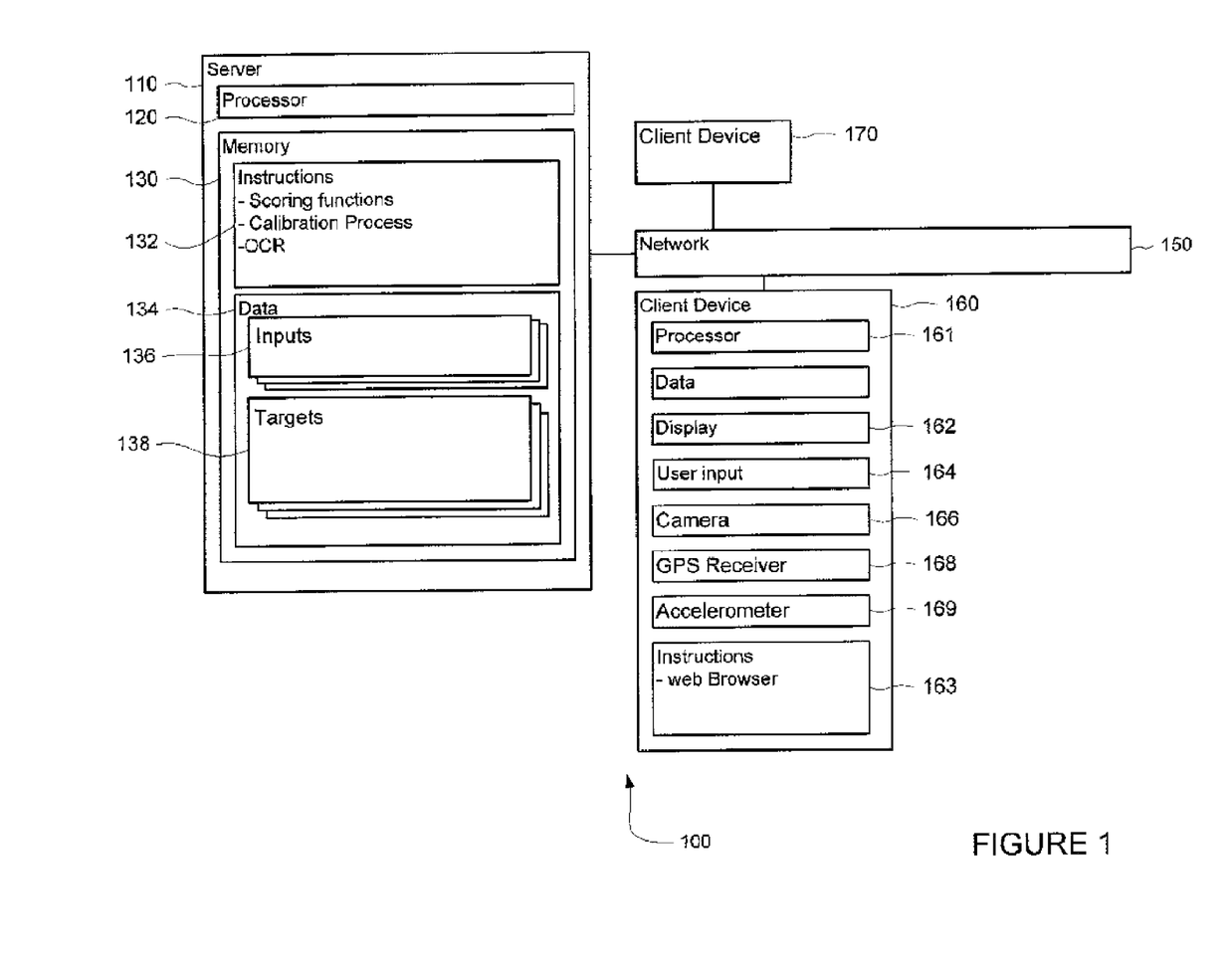
FIG. 1 is a functional diagram of a system in accordance with an aspect of the invention.
Figure 2:
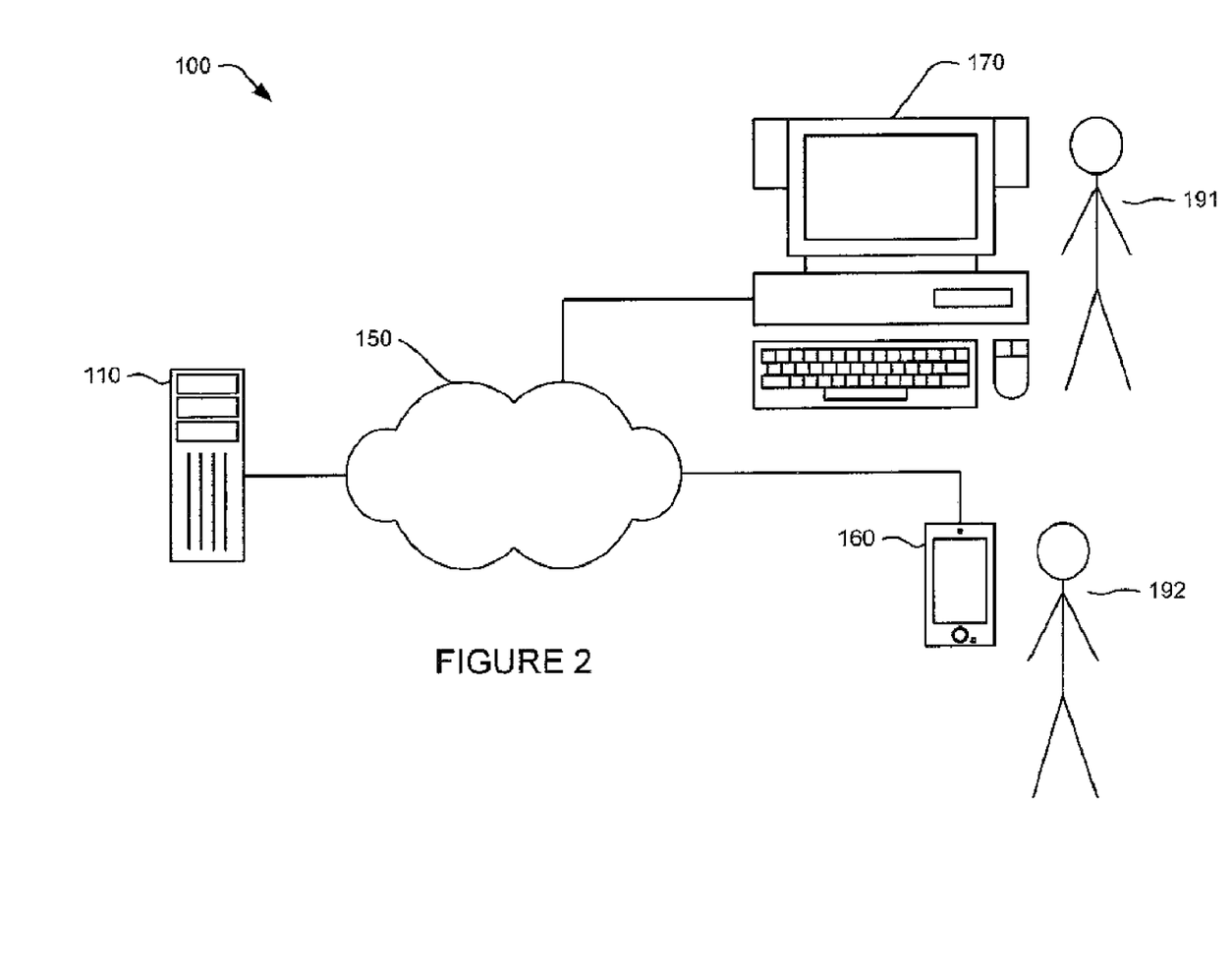
FIG. 2 is a pictorial diagram of the system of FIG. 1.

FIGS. 1-2 illustrate a system 100 that may be used in accordance with one aspect of the calibrated scoring function. It should be appreciated that the calibrated scoring function may be created using any number of devices or systems and this merely represents one possible system in which the calibrated scoring function may be used. As shown in FIG. 1, system 100 includes a computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as CPU's from Intel Corporation or Advanced Micro Devices. Alternatively, the processor may be a dedicated device such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, computer, or memory will be understood to include references to a collection of processors, computers, or memories that may or may not operate in parallel.

The computer 110 may be at one node of a network 150 and capable of directly and indirectly communicating with other nodes of the network. For example, computer 110 may comprise a web server that is capable of communicating with client devices 160 and 170 via network 150 such that server 110 uses network 150 to transmit and display information to a user, such as person 191 or 192 of FIG. 2, on display 162 of client device 160. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor 161, memory and instructions 163. Each client device 160 or 170 may be a device intended for use by a person 191-192, and have all of the components normally used in connection with a computer such as a central processing unit (CPU), memory (e.g., RAM and internal hard drives) storing data and instructions such as a web browser, an electronic display 162 (e.g., a monitor having a screen, a small LCD touch-screen, a projector, a television, a computer printer or any other electrical device that is operable to display information), and user input 164 (e.g., a mouse, keyboard, touch-screen and/or microphone). The client device may also include a camera 166, GPS receiver 168, speakers, a network interface device, as well as all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 170 may be a wireless-enabled PDA, a cellular phone, tablet PC, netbook, or notebook capable of obtaining information via the Internet. The user may input information using a small keyboard, a keypad, or a touch screen. Indeed, client devices in accordance with the systems and methods described herein may comprise any device capable of processing instructions and transmitting data to and from humans and other computers including general purpose devices, network computers lacking local storage capability, and set-top boxes for televisions.

The client devices may also include a geographic position component to determine the geographic location and orientation of the device. For example, client device 171 may include a GPS receiver 168 to determine the device's latitude, longitude and/or altitude position. The geographic position component may also comprise software for determining the position of the device based on other signals received at the client device 160, such as signals received at a cell phone's antenna from one or more cellular towers if the client device is a cell phone. It may also include an accelerometer, gyroscope or other acceleration device 169 to determine the direction in which the device is oriented. By way of example only, the acceleration device may determine its pitch, yaw or roll (or changes thereto) relative to the direction of gravity or a plane perpendicular thereto. In that regard, it will be understood that a client device's provision of location and orientation data as set forth herein may be provided automatically to the user, to the server, or both.

Although certain advantages are obtained when information is transmitted or received as noted above, aspects of the invention are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

The server 110 includes data 134, which may represent inputs 136 and targets 138 to which the inputs may be classified. The inputs 136 and targets 138 may take the form of any data structure and may represent any number of entities or objects. For example, the data representing inputs 136 may include websites, images, books, lists, video, etc. Likewise, the targets 138 may include any type of classification that could be made for a set of inputs. In one example, the inputs 136 may be a set of street-level images, including image 360 shown in FIG. 3.

Figure 3:
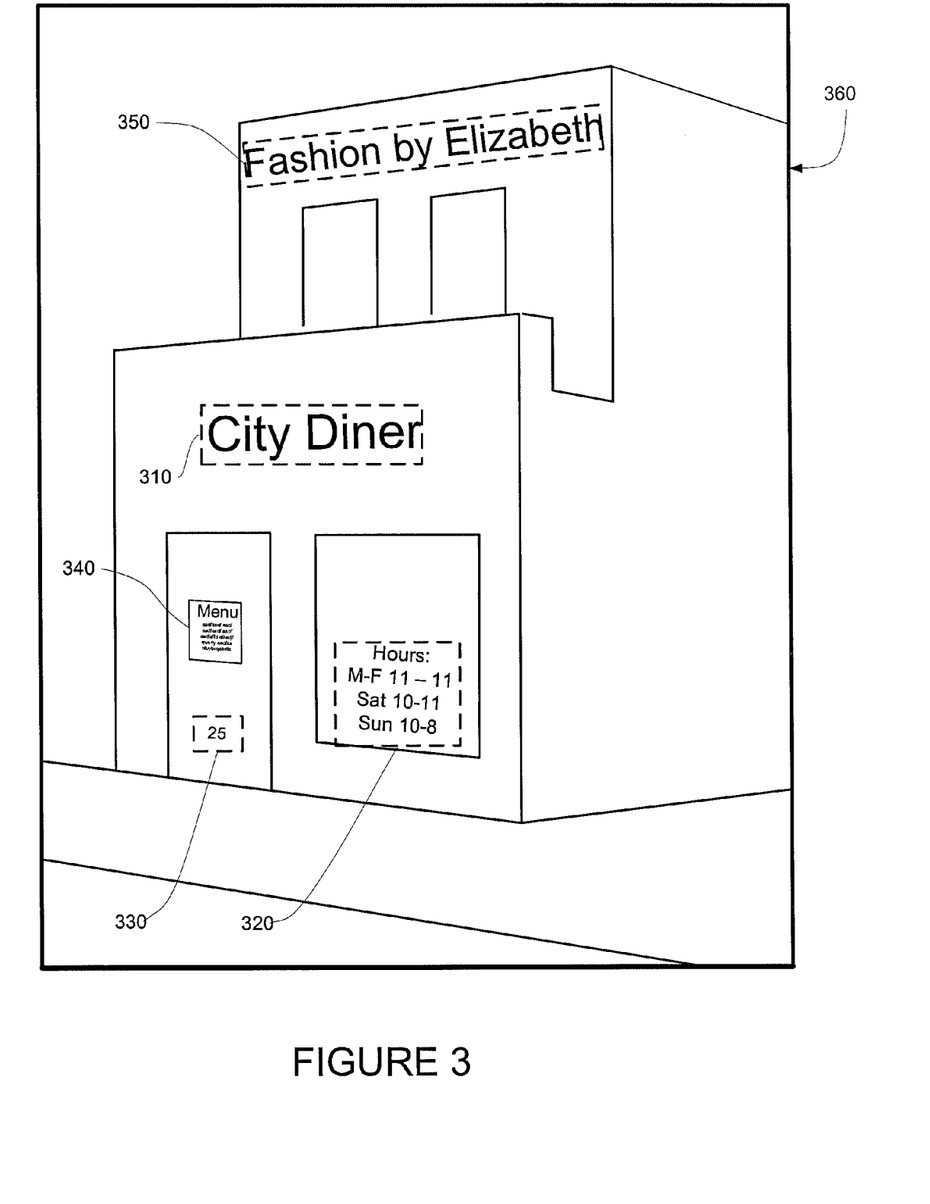
FIG. 3 is an illustration of street level image data.

As illustrated in FIG. 3, image 360 includes signs 310 and 350 that represent businesses or other establishments within the image. In some circumstances it may be beneficial for the server 110 to determine which establishments are shown within the image 360. Accordingly, the server 110 may detect potential text regions in an image, such as regions 310, 320, 330, 340, and 350 in FIG. 3. The server then performs a process for recognizing the text strings using optical character recognition (OCR) technology.

The server then searches for known establishments near the location of the image 360 and extracts phrases from information related to the signs for the nearby establishments. The server 110 then compares the text strings recognized in the image with the names from the data of nearby establishments. If any establishment data matches a text string in the image, the establishment may be associated with that particular image 360. In addition, all images that show at least part of the establishment's sign may be tagged as being associated with a particular establishment. Accordingly, based on signs 310 and 350, image 360 may be tagged as being associated with the establishments for "City Diner" and "Fashion by Elizabeth".

In many instances, server 110 will have access to numerous images for a particular location. In some of the images, the sign for a particular establishment will be at least partially obscured by other objects such as trees or buildings. In addition, the lighting and sharpness of the image may cause some of the characters within the sign to be misidentified by the server during the OCR process. Accordingly, the server may implement a scoring function S (image, establishment) to determine how well a particular establishment (the target) appears in a particular image (the input). This scoring function may take any form and may be based on any number of factors.

In one embodiment, the scoring function is based on the sign's visibility, and may be calculated by determining the percentage of OCR'ed characters within a particular text string that match an establishment's name. For example, a first image may contain a sign for which the OCR'ed text string contains all nine characters of "City Diner", while a second image contains an OCR'ed text string that contains only seven characters (e.g., "City Din"). The first image would be given a score of 1 (9/9), while the second image would be given a score of 0.778 (7/9). Accordingly, by using the scoring function S (image, City Diner) for each of the images that are tagged as being associated with City Diner, server 110 will be able to identify which image, from any set of images, that has the highest visibility score.

As shown in FIG. 3, image 360 contains the City Diner sign and the Fashion by Elizabeth sign. Accordingly, server 110 may tag image 360 as being associated with both the City Diner and Fashion by Elizabeth establishments. In addition, server 110 may use the visibility scoring function S(image, establishment) as a way to determine which of the two establishments has a higher visibility in image 360. Specifically, server 110 would compare the visibility scores for S (image 360, City Diner) and S (image 360, Fashion by Elizabeth). However, in many instances, the scoring function will not produce a meaningful result. For example, establishments with shorter names will likely create higher visibility scores compared with longer named establishments. In addition, establishments containing a set of commonly used words will likely produce a higher score in a given input than an establishment with a unique combination of characters. Therefore, in circumstances where server 110 is comparing multiple targets (e.g., establishments) contained in a single input (e.g., image), the server will need to calibrate the scoring function based on the nature of the targets that are being compared.

In accordance with one aspect of the invention, the calibration of the scoring function S(input, target) for any particular target (T) may be performed by analyzing the distribution of scores produced by that target (T) for a set of inputs. Specifically, server 110 may access a set of "background" inputs and calculate the scoring function S(input, T) for each of the background inputs contained in the set. These background inputs are preferably "fake", in that they do not contain any actual relationship with target T. For example, if the target that is being calibrated is the business "City Diner", the set of background inputs, or images, would include a plurality of street level images that contain buildings and signs, but preferably none of the background images would contain an image of the City Diner itself. Accordingly, image 360 would not be used in the set of background inputs in an instance where the target (T) is the "City Diner".

Figure 4:
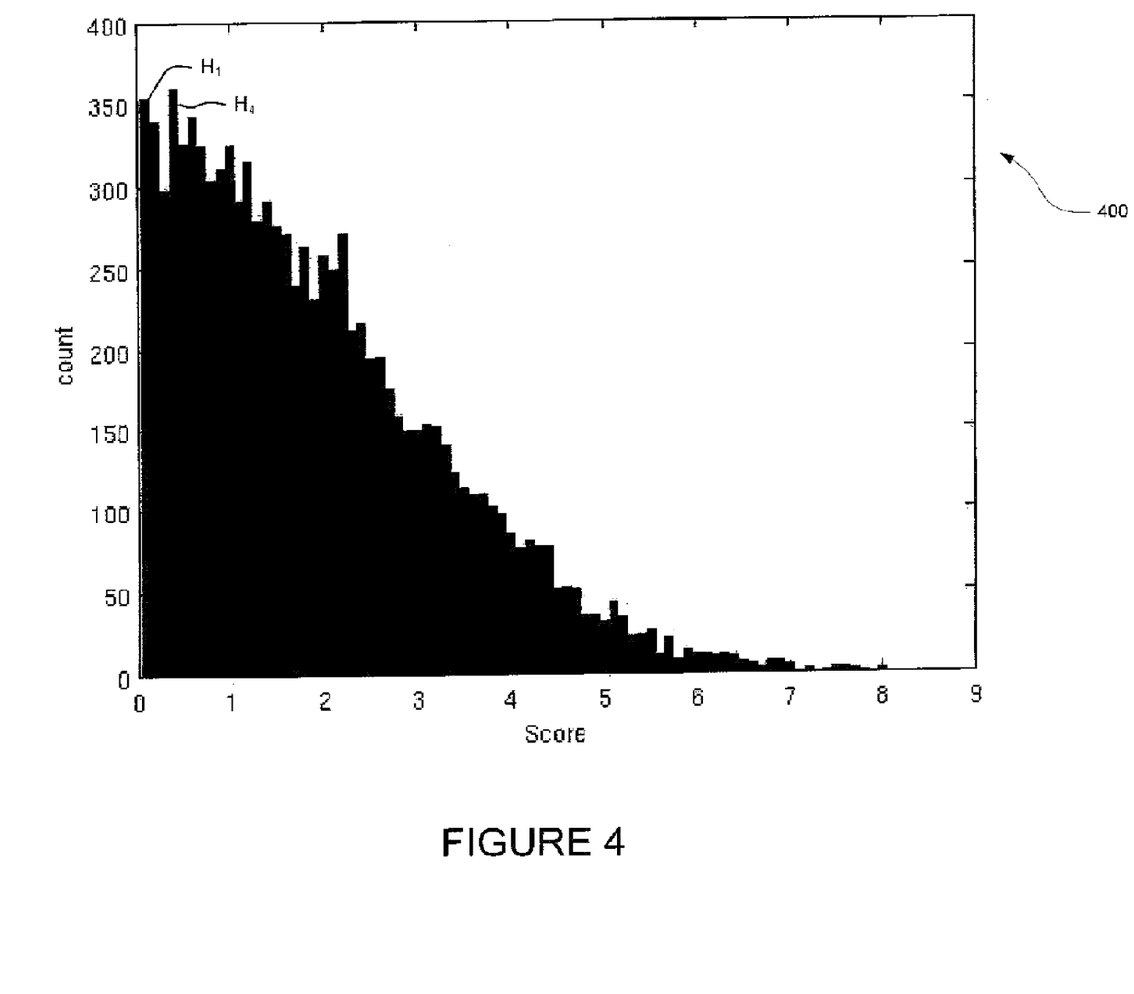
FIG. 4 is a histogram illustrating data in accordance with an aspect of the invention.

Once server 110 has calculated the scores of target (T), using the scoring function S (background input, T) for each input contained in the set of background inputs, server 110 may create a distribution of the calculated background scores. For example, the server may create a histogram of the background scores, as shown in FIG. 4. The x-axis of histogram 400 represents the potential scores resulting from the scoring function S (background input, T), wherein the background input is a street level image ("background image") and T is the establishment "City Diner". Under this scoring function, background images will be given a score based on the degree to which an OCR'ed text string within the image matches the name "City Diner". A score of 0 represents that the image does not contain any text string that even partially matches the name "City Diner", while a score of 10 represents a complete match. The y-axis represents the number of background images, from the set of background images, that receive a particular score. Accordingly, histogram 400 illustrates the "background distribution" of the City Diner establishment. As can be seen in FIG. 4, most of the scores for the background images are between a range of 0 and 3. This is to be expected as the set of background images are "false", in the since that none of the images are of the City Diner establishment. The background distribution for a target may be "higher" or "lower" relative to the background distribution of another target. A higher background distribution indicates that the target is likely to produce higher scores in connection with the background inputs. Accordingly, a "high" background distribution is one where more of the histogram contains larger bins $H_i$ at the higher scores. Preferably, the number of background inputs accessed by server 110 is large, such as being on the order of a thousand or more inputs.

Figure 5:
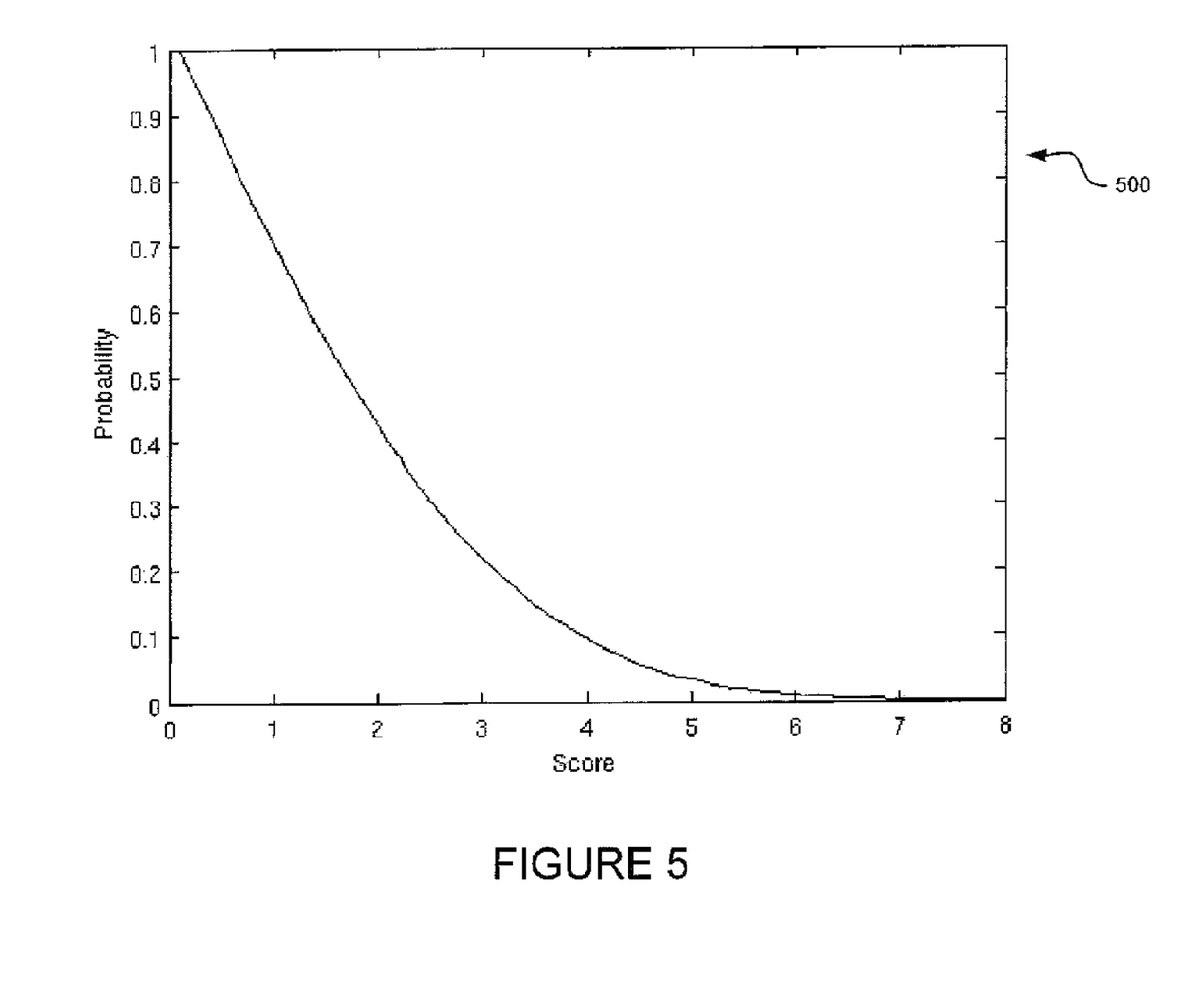
FIG. 5 is a graph illustrating data in accordance with an aspect of the invention.
Figure 6:
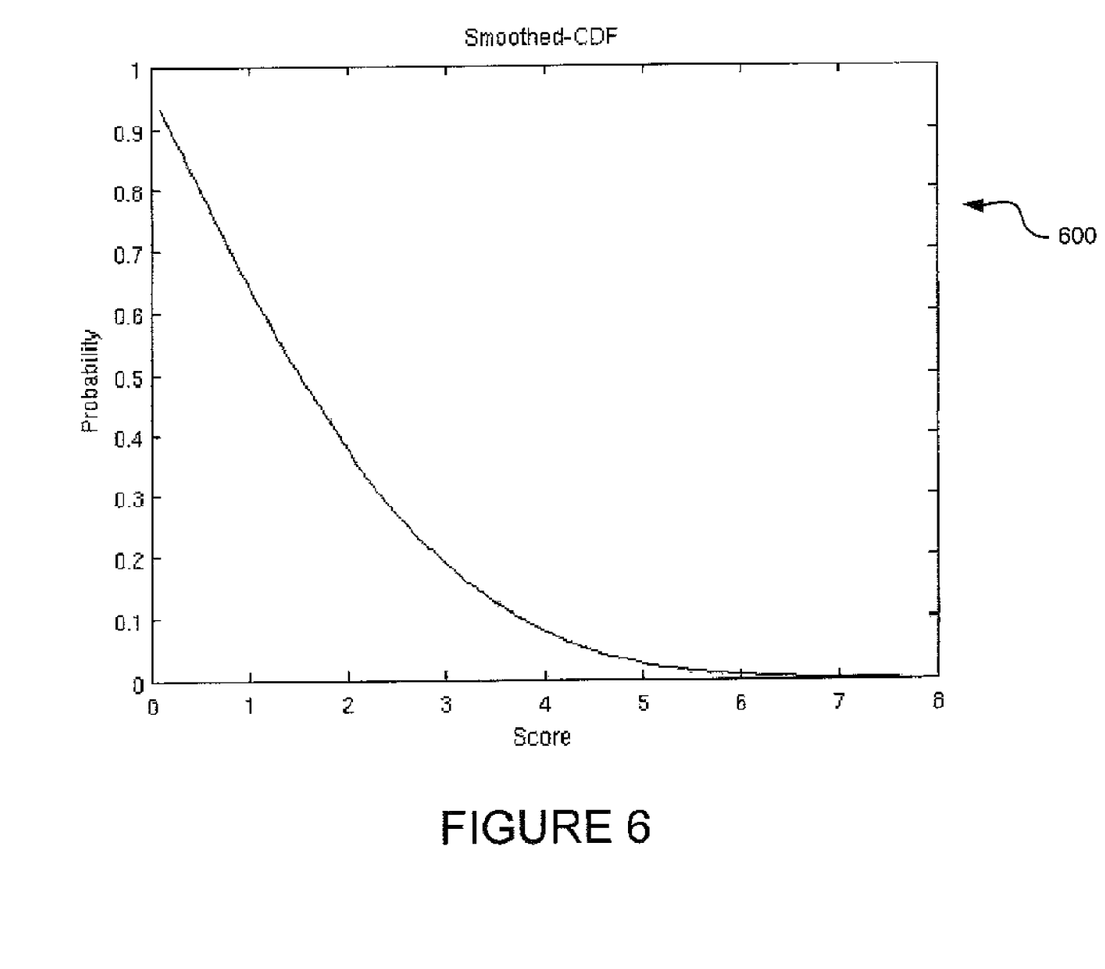
FIG. 6 is another graph illustrating data in accordance with an aspect of the invention.

Using the data represented in histogram 400, server 110 may calculate the probability of target (T) obtaining a score higher than x for a given set of background inputs. This probability can be referred to as T's "cumulative distribution function", or CDF(x). Given n scores for a target T against n background inputs, the scores for T will be collected into a histogram having N bins $H_i$, each with a width W. The CDF may be represented as follows, $CDF_i = CDF_{i+1} + H_i/n$ where $CDF_N = H_N/n$. The CDF(x) for histogram 400 is shown in FIG. 5 as graph 500, with the x-axis representing a score produced by the scoring function S(input, T), and the y-axis representing the probability that scoring function S (background input, T) will, for a given set of background inputs—produce a score greater than the x-axis value. As illustrated in FIG. 5, the CDF has been normalized so that the probabilities run between a range of 0 and 1. In addition, the CDF results represented in graph 500 may be smoothed so as to create a smoothed CDF (SCDF). The smoothing of the CDF may be performed using a Hamming filter or Gaussian filter having a width that is significantly less than N. A representation of the SCDF is shown in FIG. 6 as graph 600.

Figure 7:
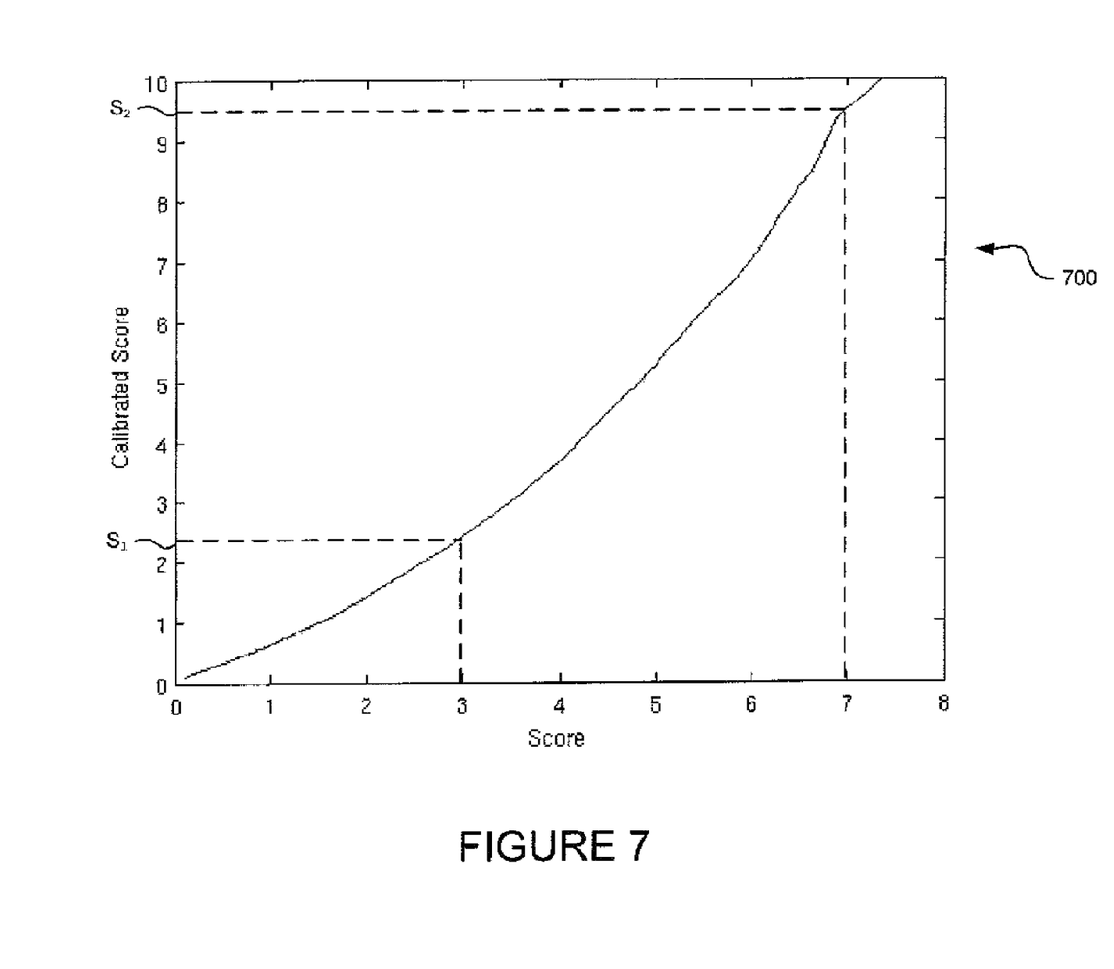
FIG. 7 is yet another graph illustrating data in accordance with an aspect of the invention.

Using the data represented in the SCDF, server 110 creates a calibrated scoring function S'(input, T). In accordance with one aspect of the invention, the server may take the $-\log_2(SCDF_i)$, so as to create a set of calibrated scores as shown in FIG. 7. The x-axis of graph 700 represents the raw scores created by S(input, T), while the y-axis represents the calibrated scores for S'(input, T). For example, if a test input creates a score of 3 using S (test input, T), then calibrated score $S_1$, as shown in graph 700, will be approximately 2.3. Likewise, a test input that creates a score of 7 in connection with target (T) will be given a calibrated score $S_2$ of approximately 9.5.

Often the score produced by a scoring function S(input, target) will only be meaningful at or above some threshold t. For example, the scoring may inherently include background noise, or may return a value of zero if enough evidence of the target is not found within the input. In this instances, the server 110 may evenly distribute the count for all scores lower that t among each of the histogram bins $H_i$ that represent scores lower than t. In addition, the background distribution for a particular target (T) may not have enough scores above some minimum score ("min_score") in order to provide a meaningful calibration. Accordingly, in an alternative embodiment, server 110 may, in such cases, replace the results of the background distribution for target (T) with some "default model" for all scores above min_score. The default model may be created by collecting the background distribution for some large set of targets. In other words, the scoring function S (background input, target) is used for every background input in connection with every target within a particular set of targets so as to create an $SCDF_{all}$ representing the cumulative distribution function for all of the known targets. In addition, the value of the default model may be limited by some factor K (e.g., K=1.0) of the default model. This would allow server 110 to use the default model for any target (T) that has a background distribution that is lower than the average target, as represented in $SCDF_{all}$. Under this embodiment, targets with a higher than average background distribution would have their calibrated scores lowered relative to other targets, while targets with a lower than average background distribution would not have their calibrated scores increased relative to other targets. The calibrated scoring function S'(input, T) may also be limited so that the calibrated score does not go above some predetermined maximum value (e.g., 10) or below some predetermined minimum value (e.g., 0).

The calibrated scoring function described above may be summarized mathematically. Specifically, model (M) for a target (T) and related $SCDF_i$ can be created, as follows:

$$M_i = \min(K * M_i^{all}, U, -\log_2(SCDF_i))$$

$M_i^{all}$ represents the default model for all scores of all targets. K represents the optional limiting factor, and U represents the optional upper limit on calibrated scores. Given this model $M_i$ any raw score S(input, T) can be calibrated using any known interpolation method. For example, the following linear interpolation may be used:

$$S' = (1-k)M_i + k*M_{i+1}$$

Where k=x−i, x=S/W, and i=floor(x). However, for x≦0, then S'=0, and for x≧N, $S'=M_N$.

Returning back to image 360 shown in FIG. 3, server 110 may take both the "City Diner" and "Fashion by Elizabeth" establishments as targets T1 and T2, respectively for a scoring function S (image 360, T1) and S (image 360, T2). Prior to determining which target has a higher calibrated score, server 110 determines each target's background distribution. Accordingly, sever 110 will calculate the scoring function for "City Diner" in connection with a set of background images. This will create a background distribution for "City Diner". Likewise, server 110 will perform the scoring function for "Fashion by Elizabeth" in connection with a set of background images, so as to create a background distribution for "Fashion by Elizabeth". Using the method described above, the two background distributions may then by used to create a calibrated scoring function S' (image 360, T) that makes use of the calibration model described above. For example, if City Diner produces a higher background distribution compared with Fashion by Elizabeth (City Diner's histogram contains more images with higher scores), then it indicates that City Diner is more likely to produce "false positives" under the scoring function. Accordingly, the calibration of City Diner's score will cause it to be lowered relative to the score for Fashion by Elizabeth.

Figure 8:
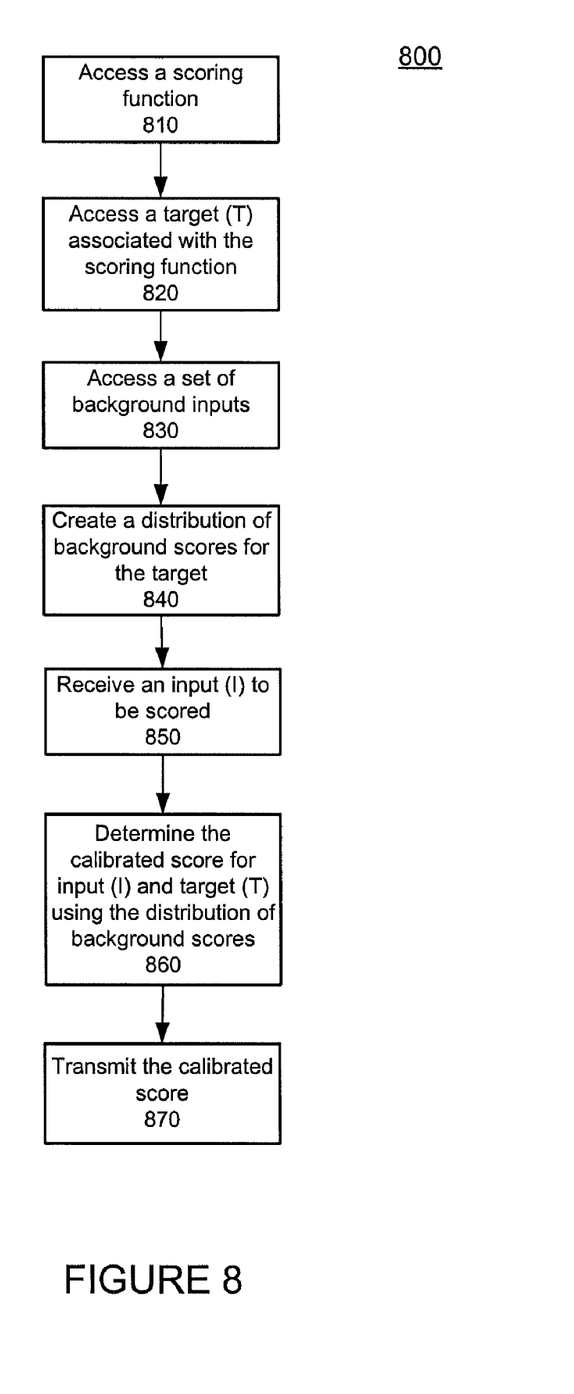
FIG. 8 is a flow diagram in accordance with aspects of the invention.

FIG. 8 illustrates a process that may be performed in accordance with one particular embodiment. Specifically, server 110 may access a scoring function S(input, target) that provides a score indicating the degree of correlation between an input and a target to which the input can be classified (Block 810). Server 110 may also access a particular target (T) that can be scored using the scoring function S(input, target (T)) (Block 820). In Block 830, the server 110 accesses the set of "background inputs". As set forth above, these background inputs are "fake" in that they do not have any direct relationship with target (T). Server 110 may then create a distribution of background scores for target (T) by applying each of the background inputs to the scoring function S(input, target (T)) (Block 840). Server 110 may then receive an input (I) that is to be scored using scoring function S(input (I), target (T)) (Block 850). Input (I) may already exist on the server 110, or may be transmitted to the server from a device, such as client device 160. Server 110 then determines the calibrated score for input (I) in connection with target (T) (Block 860).

The determination of the calibrated score is based, at least in part, on the distribution of background scores created in Block 840. Specifically, server 110 may use the distribution of background scores to create a calibration model, as described above. This calibration model may then be used to create a calibrated score based on a calibrated scoring function S'(input (I), target (T)). Finally, server 110 may transmit the calibrated score over a network (Block 870). For example, server 110 may transmit the calibrated score over network 150 to device 160, as provided in FIG. 1. It should be appreciated that while the process in FIG. 8 is shown in a certain order, the series of blocks may be performed in a different order. In addition, some blocks may be added or omitted in the process.

In an alternative embodiment, server 110 may provide the client device 160 with turn-by-turn directions along a desired route that include an indication of landmarks or establishments along the route. For example, server 110 may transmit directions to device 160 that include the instruction to "Turn right at City Diner". In order to determine which establishment to use, server 110 may compare the calibrated scores for establishments shown in a particular image taken at a location along the route. The establishment with the highest calibrated score may then be selected by the server to be incorporated into the turn-by-turn directions.

While the calibration process has been described above in connection with a scoring function that determines whether an image contains OCR'ed text relating to one or more target establishments, it should be appreciated that the scoring function S(input, target) could relate to any set of data structures. For example, given a large set of websites A, and a small set of selected websites B (a subset of A), a scoring function f(B, C) could be used to score the relevance of the set B to website C. This relevance could be based on the number of times that a user visits both website C and a website in set B within a particular time period or within a particular on-line session. In order to rank websites based on their relevance to B, the above described method for calibrating the score for C can be used. Specifically, the calibration will be based on the distribution of scores for small subsets of A (e.g., $A_i$) using the scoring function f($A_i$, C).

Similarly, given a large set of websites A, a scoring function f(C, B) may be used that determines the number of times a term B appears within a website C. In order to make the scoring function useful for ranking terms based on their relevance to Website C, the above described calibration method could use the distribution of scores for f(X, B) over many random websites X, for term B. Accordingly, the inputs and scoring functions are not limited to images, but may relate to any data structure, such as websites, documents, books, video, etc.

In an alternative embodiment, a specific input (I) and target (T) may be provided to server 110 via a client device 160 of FIGS. 1 and 2. For example, a user of device 160 may wish to determine whether a particular term has a high correlation with a particular website. Accordingly, the user may use the user input 164 to input or select the desired term and website, and then transmit the term and website to server 110 via network 150. Using the calibration method described herein, server 110 may provide the user with a calibrated score that indicates the degree of correlation between the selected term and website. In addition, the user may provide server 110 with multiple websites and in response, server 110 would provide client device 160 with a ranking of the terms based on their calibrated scoring functions in connection with the selected website. This information may be provided to the user on the display 162.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of calibrating a scoring function, the method comprising:
    accessing a scoring function, wherein the scoring function provides a score indicating a degree to which an input relates to a classification;
    receiving a first classification;
    accessing a set of background inputs that have no more than an incidental relation to the first classification;
    applying the scoring function to each of the background inputs in connection with the first classification so as to create a first distribution of background scores;
    receiving a first input that is not included in the set of background inputs;
    altering the scoring function in accordance with the first distribution of background scores to create a first calibrated scoring function; and
    determining a first calibrated score for the first input in connection with the first classification using the first calibrated scoring function.

2. The method of claim 1, wherein the first input and the set of background inputs are images, the classification is an establishment, and the score from the scoring function relates to the amount of evidence that exists as to whether the establishment appears within a particular image.

3. The method of claim 1, wherein the first input, the set of background inputs, and classification are websites, and the score from the scoring function relates to the number of users that visited both a first input website and one or more classification websites.

4. The method of claim 1, wherein the first input and the set of background inputs include text, the classification is a phrase, and the score from the scoring function relates to number of times the phrase appears within a particular input.

5. The method of claim 4, wherein the first input and the set of background inputs are selected from the group consisting of: documents, websites, or books.

6. The method of claim 1, wherein determining the calibrated score includes creating a cumulative distribution function (CDF), the CDF indicating, for a subset of potential scores, the probability of the distribution of background scores being higher than each of the potential scores.

7. The method of claim 6, wherein determining the calibrated score includes:
smoothing the CDF to create a smoothed CDF (SCDF); and
calculating $-\log_2(SCDF)$.

8. The method of claim 7, wherein the CDF for any potential score is represented as $CDF_i = CDF_{i+1} + H_i/n$, where n is the number of potential scores, $H_i$ represents the number of background inputs receiving a score i, and $CDF_N = H_N/n$.

9. The method of claim 7, wherein determining the calibrated score includes:
calculating $M_i = \min(K*M_i^{all}, U, -\log_2(SCDF_i))$, where $M_i^{all}$ represents a default model for all background scores relating to a set of classifications, K represents an optional limiting factor, and U represents an upper limit on calibrated scores.

10. The method of claim 1 further comprising:
accessing a second classification, wherein the scoring function provides a second score indicating a degree to which an input relates to the second classification;
applying the scoring function to each of the background inputs in connection with the second classification to create a second distribution of background scores;
altering the scoring function in accordance with the second distribution of background scores to create a second calibrated scoring function;
determining a second calibrated score for the first input in connection with the second classification using the second calibrated scoring function; and
comparing the first calibrated score and the second calibrated score.

11. The method of claim 10, wherein the second calibrated score is for a second input in connection with the second classification.

12. The method of claim 10, further comprising transmitting data over a network based on the comparison of the first calibrated score and the second calibrated score.

13. The method of claim 1, further comprising:
accessing a set of default classifications;
applying the scoring function to each combination of background inputs and default classifications, to create a default background distribution; and
altering the first calibrated scoring function in accordance with the default background distribution.

14. The method of claim 13 further comprising:
comparing the default background distribution to the first distribution of background scores;
wherein the altering of the first calibrated scoring function occurs only if the first distribution of background scores indicates a higher score than the default background distribution.

15. A device for calibrating a scoring function:
a memory for storing classifications, inputs, and scoring functions, wherein at least a subset of the inputs are background inputs; and
a processor coupled to the memory, the processor configured to execute the instructions to:
access a first classification and a scoring function, wherein the scoring function provides a score indicating a degree to which an input relates to the first classification;
access background inputs that have no more than incidental relation to the first classification;
apply the scoring function to each of the background inputs in connection with the first classification so as to create a first distribution of background scores;
access a first input that is not included in the set of background inputs; and
determine a first calibrated score for the first input in connection with the first classification, the first calibrated score being determined by altering the scoring function in accordance with the distribution of background scores.

16. The device of claim 15, wherein the first input and the set of background inputs are images, the first classification is an establishment, and the first score from the scoring function relates to whether the establishment appears within a particular image.

17. The device of claim 15, wherein the first input, the set of background inputs, and first classification are websites, and the first score from the scoring function relates to the number of users that visited both a first input website and one or more classification websites.

18. The device of claim 15, wherein the first input and the set of background inputs include text, the classification is a phrase, and the first score from the scoring function relates to number of times the phrase appears within a particular input.

19. The device of claim 15 wherein the instructions further cause the processor to:
receive a second classification, wherein the scoring function provides a second score indicating a degree to which an input relates to the classification;
apply the scoring function to each of the background inputs in connection with the second classification so as to create a second distribution of background scores;
determine a second calibrated score for the first input in connection with the second classification, the second calibrated score being determined using the second distribution of background scores to alter the second score of the scoring function; and
compare the first calibrated score and second calibrated score.

20. The device of claim 15 wherein the processor is further configured to:
transmit data relating to the classification having a higher calibrated score.

* * * * *